(12) United States Patent
Young (10) Patent No.: US 10,471,816 B1
(45) Date of Patent: Nov. 12, 2019

(54) RECREATION VEHICLE COVER AND METHOD FOR REMOVING SAME

(71) Applicant: William Troy Young, Tooele, UT (US)

(72) Inventor: William Troy Young, Tooele, UT (US)

( * ) Notice: Subject to any disclaimer, the term of this patent is extended or adjusted under 35 U.S.C. 154(b) by 107 days.

(21) Appl. No.: 15/886,657

(22) Filed: Feb. 1, 2018

Related U.S. Application Data (60) Provisional application No. 62/455,176, filed on Feb. 6, 2017.

(51) Int. Cl.
| | |
|---|---|
| *B60J 11/04* | (2006.01) |
| *B60J 7/08* | (2006.01) |
| *E04F 10/02* | (2006.01) |
| *B62D 35/00* | (2006.01) |
| *B60J 11/06* | (2006.01) |

(52) U.S. Cl.
CPC ............ *B60J 11/04* (2013.01); *B60J 7/08* (2013.01); *E04F 10/02* (2013.01); *B60J 11/06* (2013.01); *B62D 35/001* (2013.01)

(58) Field of Classification Search
CPC .... B60J 11/04; B60J 7/08; B60J 11/06; E04F 10/02; B62D 35/001
USPC ...................................................... 296/136.1
See application file for complete search history.

(56) References Cited

U.S. PATENT DOCUMENTS

| | | | |
|---|---|---|---|
| 2,620,007 A * | 12/1952 | Keller ................ | B60J 11/00 150/166 |
| 2,679,254 A | 5/1954 | Green | |
| 7,467,784 B2 | 12/2008 | Turner | |
| 9,381,797 B2 | 7/2016 | Chen | |
| 2001/0038226 A1* | 11/2001 | Hoenack ............. | B60J 11/00 296/136.1 |
| 2001/0045760 A1* | 11/2001 | Syron ................ | B05B 12/24 296/136.1 |
| 2005/0139300 A1* | 6/2005 | Harmon .............. | B60J 11/00 150/166 |
| 2006/0214465 A1* | 9/2006 | Chau ................. | B60J 11/00 296/136.1 |
| 2009/0066112 A1* | 3/2009 | Sharapov ........... | B60J 11/00 296/136.1 |
| 2015/0274220 A1* | 10/2015 | Telnack ............. | B62D 35/001 296/180.4 |
| 2015/0275523 A1* | 10/2015 | Herrin .............. | E04F 10/0633 160/67 |
| 2016/0009167 A1 | 1/2016 | Ein | |

(Continued)

FOREIGN PATENT DOCUMENTS

KR     1020140027737     8/2012

*Primary Examiner* — Pinel E Romain
(74) *Attorney, Agent, or Firm* — Thorpe, North & Western, LLP (57) ABSTRACT

Retraction technology is disclosed for covers of recreational vehicles. In one example, a retraction system comprises a cord extending across a cover between front and back panels with a front end couplable to the front panel, and a rear free end disposed at the back panel of the cover. In another example, an intermediate guide is disposed at an intermediate point of the cover and configured to be located over an accessory of the RV, with the cord passing through the intermediate guide. In another example, a cover attachment attaches the cord to the cover with a one or more loops. A portion of the cover is inserted the one or more loops and constrained or cinched therein.

22 Claims, 10 Drawing Sheets

(56) References Cited

U.S. PATENT DOCUMENTS

2016/0107516 A1    4/2016  Ein
2018/0355630 A1*  12/2018  Kent ........................ B60J 11/04

* cited by examiner

RECREATION VEHICLE COVER AND METHOD FOR REMOVING SAME

PRIORITY CLAIM(S)

Priority is claimed to U.S. Provisional Patent Application Ser. No. 62/455,176, filed Feb. 6, 2017, which is hereby incorporated herein by reference.

TECHNICAL FIELD

Embodiments described herein relate generally to a cover for a recreational vehicle and a method for removing the cover.

BACKGROUND

Owners of recreational vehicles (RVs), such as travel trailers and motor homes, often cover their RV when not in use to protect the RV from the elements. Such covers are often substantially fitted to the RV. In addition, such RVs are often sizable, making the covers bulky and difficult to remove and deploy. Thus, such covers can be made of thin and light weight material to reduce bulk. Furthermore, RVs can have accessories or utilities that can protrude from the roof and sides thereof, such as air-conditions (AC) units, satellite dishes, storage containers, awning and awning support and storage structure, supplemental storage containers, etc. Such accessories can provide obstacles to removing a covering from the RV. Often multiple people, some on ladders, are required to cover the RV with the cover, and to remove the cover from the RV. Care is usually required to ensure that the cover does not catch and rip on one of the accessories. Working from a ladder can also present safety issues in addition to frustration.

BRIEF DESCRIPTION OF THE DRAWINGS

Invention features and advantages will be apparent from the detailed description which follows, taken in conjunction with the accompanying drawings, which together illustrate, by way of example, various invention embodiments; and, wherein:

FIG. 5 is a partial detailed top schematic view of the cover with the retraction system of FIG. 1a;

FIG. 6 is a top schematic view of a cover attachment of the retraction system of the cover of FIG. 1a;

Reference will now be made to the exemplary embodiments illustrated, and specific language will be used herein to describe the same. It will nevertheless be understood that no limitation of the scope or to specific invention embodiments is thereby intended.

DESCRIPTION OF EMBODIMENTS

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel
} characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

EXAMPLE EMBODIMENTS

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

In one example, a cover with a retraction system is configured for covering a recreational vehicle (RV). The cover device comprises a top panel, opposite side panels contiguous with the top panel, a front panel contiguous with the top panel, and a back panel contiguous with the top panel, and sized and shaped to substantially match a roof, opposite sides, a front and a back of the RV, respectively. A cord extends across the cover between the front and back panels with a front end couplable to the front panel, and a rear free end disposed at the back panel of the cover. In one aspect, the front end of the cord is attached to a bottom edge of the front panel of the cover. Pulling the rear free end of the cord causes the front end of the cord to draw a lower portion of the front panel of the cover up and over an upper portion of the front panel, and causes a front portion of the cover to fold over an intermediate portion of the cover forming an outer portion of the cover folding over an inner portion of the cover. Pulling the rear free end of the cord causes the front panel of the cover to slide over the cover and follow the cover over an accessory of the RV, with an outer portion of the cover folded over an inner portion of the cover, and with the inner portion of the cover forming a guide for the outer portion of the cover over the accessory of the RV.

In one aspect, the cover device can further comprise an intermediate guide at an intermediate point of the cover and configured to be located over an accessory of the RV. The cord passes through the intermediate guide. The intermediate guide can comprise a patch coupled to the cover, and a ring coupled to the patch and receiving the cord therethrough.

In another aspect, the cover device can comprise a cover attachment between the front end of the cord and the cover. The cover attachment can concentrate a length of the bottom or bottom edge of the front of the cover to resist tearing or otherwise damaging the cover when force is concentrated as the cord is pulled. The cover attachment can comprise at least one loop coupled to the front end of the cord. A portion of the cover is inserted through the at least one loop. The loop can be contracted about the portion of the cover in the loop. In another aspect, a plate can be coupled to and intersecting the at least one loop, and the portion of the cover in the loop can be cinched between the at least one loop and the plate. In another aspect, the cover attachment comprises a pair of loops, including first and second loops, coupled to the front end of the cord. A portion of the cover is inserted through the first and second loops, around the second loop, and back through the first loop.

Furthermore, the invention can provide a method for removing a cover from a recreational vehicle (RV). The cover has at least a top panel, opposite side panels, a front panel and a back panel substantially matching a roof, opposite sides, front and back of the RV, respectively. The method comprises: providing a retraction system comprising a cord extending across the cover between the front and back panels with a front end couplable to the front panel, and a rear end disposed at the back panel of the cover; pulling the rear end of the cord and causing the front end of the cord to draw a lower portion of the front panel of the cover up and over an upper portion of the front panel, and causing a front portion of the cover to fold over an intermediate portion of the cover forming an outer portion of the cover folding over an inner portion of the cover; and continuing to pull the cord with the front panel of the cover sliding over the cover and following the cover over an accessory of the RV, with the outer portion of the cover folded over the inner portion of the cover, and with the inner portion of the cover forming a guide for the outer portion of the cover over the accessory of the RV.

Figure 1A:
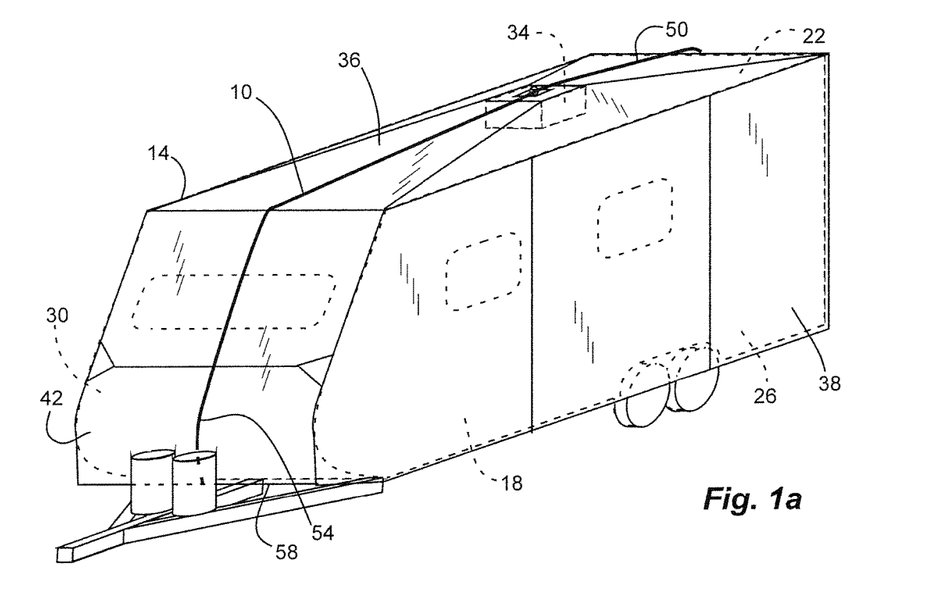
FIG. 1a is a front perspective schematic view of a cover with a retraction system on a recreational vehicle (RV) in accordance with one example, showing the RV covered by the cover.
Figure 1B:
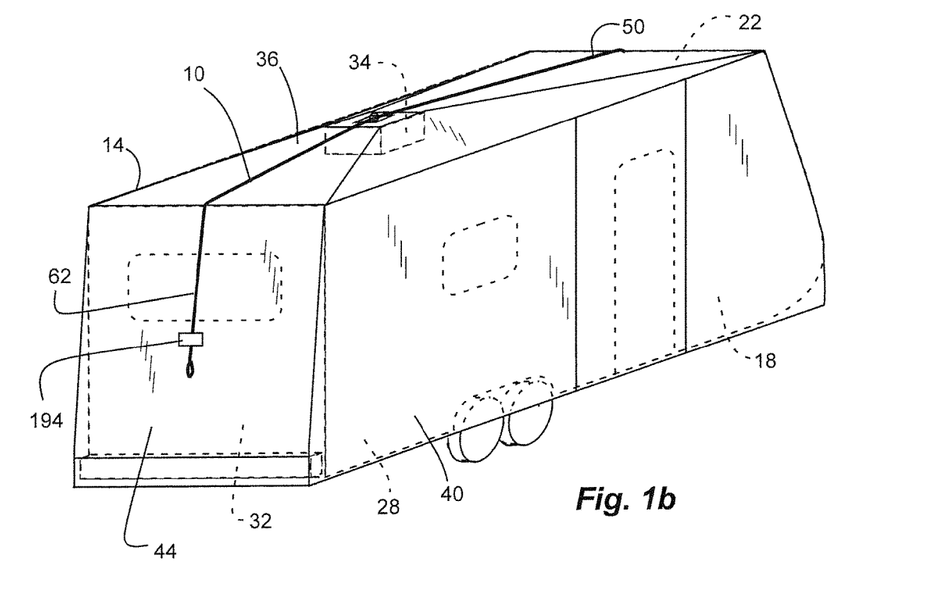
FIG. 1b is a rear perspective schematic view of the cover with the retraction system on the RV of FIG. 1a, showing the RV covered by the cover.
Figure 2A:
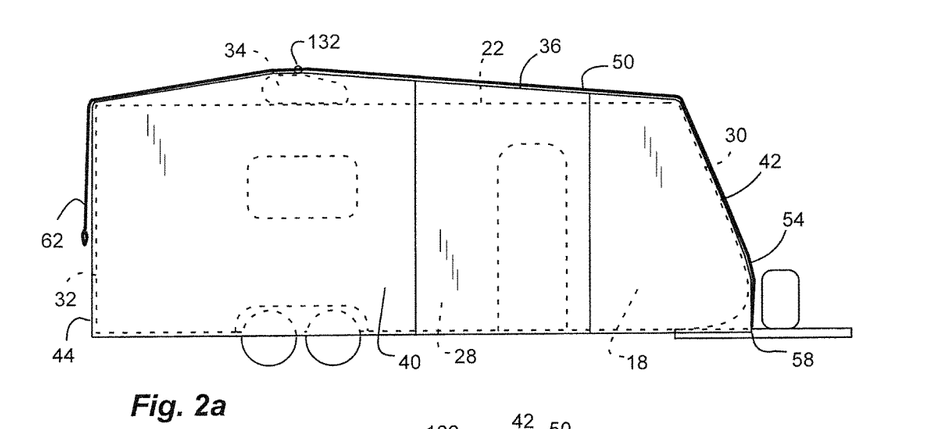
FIG. 2a is a side schematic view of the cover with the retraction system on the RV of FIG. 1a, showing the RV covered by the cover.

FIG. 1a shows a front perspective schematic view of a retraction system 10 incorporated with or in combination with a cover 14 for a recreational vehicle (RV) 18 in accordance with an example. Similarly, FIG. 1b is a rear perspective schematic view of the retraction system 10 with the cover 14 for the RV 18. FIG. 2a is a side schematic view of the retraction system 10 with the cover for the RV 18.

Figure 4:
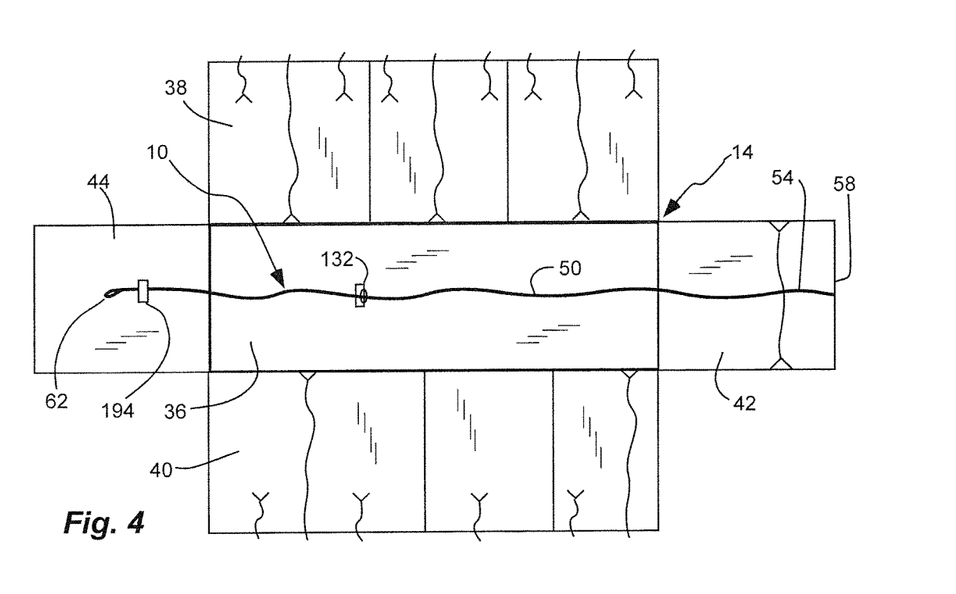
FIG. 4 is a top schematic view of the cover with the retraction system of FIG. 1a, shown laid out flat.
Figure 5:
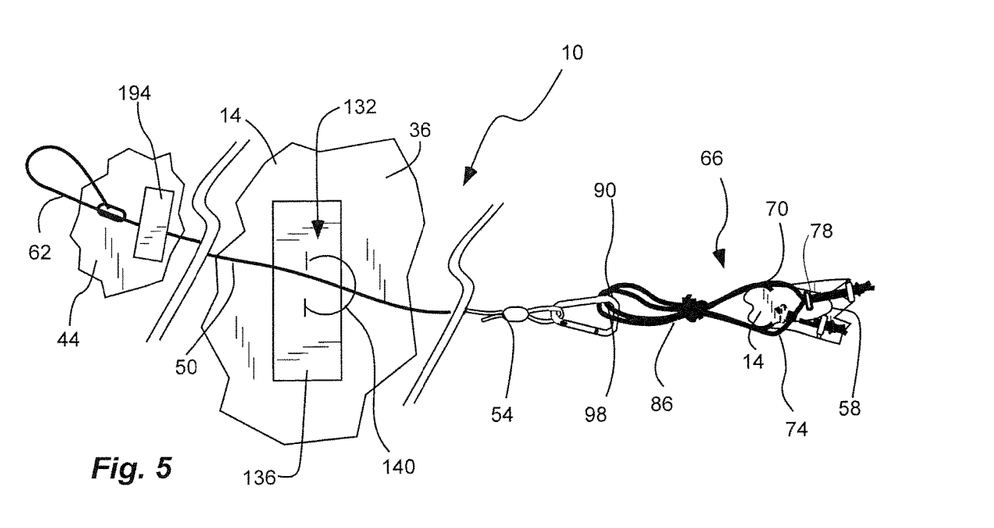

FIG. 4 is a top view of the retraction system 10 with the cover 14 shown with the cover laid out flat. FIG. 5 is a partial detailed top view of the retraction system 10 with the cover 14. By way of example, the RV 18 can be a travel trailer with a hitch couplable to a tow vehicle. In another example, the RV can be a motor home with a motor. The RV 18 can have a substantially rectangular block shape with a roof 22, opposite sides 26 and 28, a front 30 and a back 32. The shape of the RV 18 can also be slopped or wedged, such as in the front. The shape of the RV 18 can also include curvature between the contiguous sides, and/or from front to back between the front and the roof, and the roof and the back, and/or overall. In addition, the RV 18 can include one or more accessories 34 disposed on or extending above the roof 22. The accessories 34 can include an air-conditioning (AC) unit, a satellite dish, an antenna, a storage container or area, a solar panel, a light, a speaker, etc. In addition, the one or more accessories can be disposed near the roof, such as with an awning or cover thereof.

In one example, the cover 14 can be custom fitted to or can substantially match the size and shape of the RV 18. Thus, the cover 14 can have at least a top panel 36, opposite side panels 38 and 40 contiguous with the top 36, a front panel 42 contiguous with the top panel 36, and a back panel 44 contiguous with the top panel 36, and substantially matching the roof 22, opposite sides 26 and 28, the front 30 and the back 32 of the RV 18, respectively. The top panel 36 of the cover 14 can have substantially the same size and shape as the roof 22 of the RV 18. Similarly, the side panels 38 and 40 can have substantially the same size and shape as the sides 26 and 28 of the RV 18; and the front panel 42 can have substantially the same size and shape as the front 30 of the RV 18; and the back panel 44 can have substantially the same size and shape as the back 32 of the RV 18. Thus, the cover 14 can form a shell with an open bottom that fits over the RV 18. The panels of the cover 14, such as the side panels 38 and 40, can be segmented into two or more portions coupled together with fasteners, such as zippers or hook-and-loop fasteners. Similarly, contiguous side and end panels can be coupled together with fasteners, such as zippers or hook-and-loop fasteners. In addition, the cover 14 can have portions, such as opposite sides of the front panel 42, coupled together by an adjustable strap to help fit the cover 14 to the RV 18. The cover 14 can include a lightweight, strong, water resistant, and UV resistant material. For example, the cover 14 can comprise a synthetic material of high-density polyethylene fibers, such as Tyvek®.

The retraction system 10 and/or the cover 14 comprises a cord 50 extending across the cover 14 between the front and back panels 42 and 44, and from the front 30 of the RV 18 to the back 32 of the RV. The cord 50 can be or can comprise a rope, or a strap, or the like. The cord 50 has a front end 54 coupled to the front panel 42. In one aspect, the cord 50 or the front end 54 thereof can be coupled to a bottom end 58 of the front panel 42. In another aspect, the cord 50 or the front end 54 thereof can be removably or releasably coupled to the front panel 42 or bottom end 58 thereof. In addition, the cord 50 has a rear free end 62, opposite the front end 54, and disposed at the back panel 44 of the cover 14. In one aspect, the rear free end 62 can be configured with a loop or a grip to facilitate gripping and handling of the cord 50. In another aspect, the distal free end 62 of the cord can be enlarged, such as with a knot, to form a grip or abutment to resist the distal free end from slipping in a user's hand. In one aspect, the cord 50 can have a length that extends substantially a length of the cover 14 (including a length of the top, front and back panels) from the bottom edge 58 of the front panel 42 of the cover 14, across the front panel 42 and the top panel 36 of the cover 14, to the rear panel 44 of the cover 14. The rear free end 62 of the cord 50 can extend to an intermediate point, such as substantially a mid-point, of the back panel 44 so that it can be reached and grasped by a user, and to keep it from contacting the ground.

Figure 6:
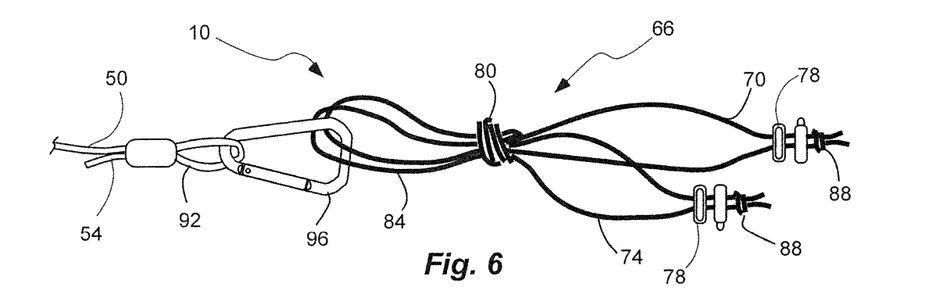

FIG. 5 is a partial detailed top schematic view of the cover 14 and the retraction system 10. FIG. 6 is a perspective schematic view of a cover attachment 66 of the retraction system 10 of the cover 14. In one aspect, the retraction system 10 can have a cover attachment 66 to couple the cover 14 to the cord 50. The cover attachment 66 is coupled to the front end 54 of the cord 50, and positioned between the front end 54 of the cord 50 and the cover 14, or bottom end 58 thereof. As mentioned above, the cord 50 can be releasably attached to the cover 14. In one aspect, the cover attachment 66 can be releasably coupled to the front panel 42 or bottom edge 58 thereof. Thus, the retraction system 10 can be retrofitted to an existing cover; removed from the cover when not in use; and/or used with multiple different covers.

In one aspect, the cover attachment 66 comprises at least one contractible loop 70 or 74 coupled to the front end 54 of the cord 50. The loop 70 or 74 can be flexible, and can be formed from, or can be, a cord. The loop 70 or 74 can removably receive at least a portion of the cover 14 therein. For example, a portion 86 or length of the bottom edge 58 of the cover 14 can be inserted through and/or removably received in the loop 70 and/or 74. In addition, the loop 70 and/or 74 can be selectively contracted and expanded to constrain and release, respectively, the cover 14 or portion thereof. In one aspect, a releasable fastener 78 can be coupled to the loop 70 and/or 74, and selectively positionable along the loop 70 and/or 74 to selectively contract or expand the loop, and thus to constrain or release, respectively, the cover 14. The releasable fastener 78 can be a spring loaded cord lock, stop, toggle, or the like, with a pair of holes to receive opposite sides of the loop, and a spring loaded release. The releasable fastener 78 can be advanced from an end of the loop 70 or 74 into an interior of the loop to reduce the size or circumference of the loop, and thus constrain the portion 86 of the cover 14 therein. In one aspect, the loop can have a pair of such releasable fasteners. The pair of releasable fasteners 78 can be advanced along the loop 70 or 74 towards one another to reduce the size or circumference of the loop, and thus constrain the portion 86 of the cover 14 therein. The portion 86 of the cover 14 in the loop 70 or 74 can be cinched between the loop 70 or 74 and the releasable fastener 78. The portion 86 of the cover 14 can include bunching the cover 14, such as the bottom edge 58 of the front panel 42, into multiple folds that consolidates or condenses or concentrating the cover into a greater thickness or width. Thus, the portion 86 of the cover 14 can be a bunched portion. It is believed that bunching the cover and cinching the cover or bunched portion thereof in the flexible loop reduces stress on a smaller portion of the cover, and thus resists ripping or otherwise damaging the cover. In one aspect, at least 20% of a length or width of the bottom edge 58 or front panel 42 of the cover 42 can be concentrated or bunched into the loop 70 and/or 74. In another aspect, at least 15% of the length or the width of the bottom edge 58 or front panel 42 of the cover 42 can be concentrated or bunched into the loop 70 and/or 74. In another aspect, at least 10% of the length or the width of the bottom edge 58 or front panel 42 of the cover 14 can be concentrated or bunched into the loop 70 and/or 74.

Figure 7A:
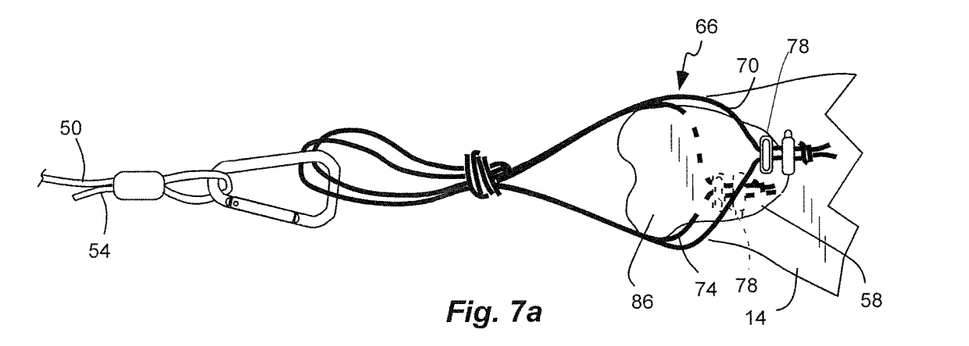
FIG. 7a is a top schematic view of the cover attachment of the retraction system of the cover of FIG. 6, shown in an open configuration with the cover.
Figure 7B:
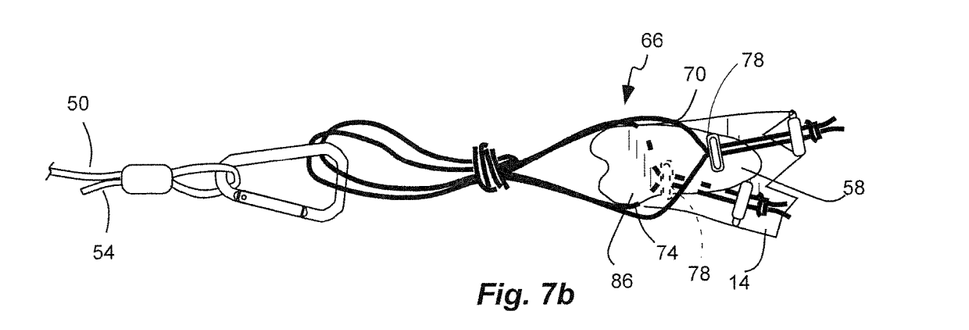
FIG. 7b is a top schematic view of the cover attachment of the retraction system of the cover of FIG. 6, shown in a contracted or cinch configuration with the cover.

In another aspect, the cover attachment 66 comprises a pair of loops, including first and second loops 70 and 74, coupled to the front end 54 of the cord 50. Each of the loops 70 and 74 can have a releasable fastener 78 coupled to and intersecting the loops 70 and 74. FIG. 7a shows a top schematic view of the cover attachment 66 of the retraction system 10 of the cover 14, showing an open configuration with the cover. The portion 86 of the cover 14 can be inserted through the first and second loops 70 and 74, around the second loop 74, and back through the first loop 70, as shown in FIG. 7a. FIG. 7b shows a top schematic view of the cover attachment 66 of the retraction system 10 of the cover 14, showing a contracted, constrained or cinch configuration with the cover. The portion 86 of the cover 14 in the pair of loops 70 and 74 can be constrained or cinched between the pair of loops 70 and 74 and the releasable fastener(s) 78.

Referring again to FIG. 6, the loop(s) 70 and 74 can be formed by a pair of cords bundled or placed together in parallel adjacent one another, and doubled over so that the free ends are together, and tied in an intermediate knot 80 to form a proximal loop 84 and four distal free strands. The releasable fasteners 78 can be coupled to a pair of distal ends (or of each cord) of the free strands to form the pair of loops 70 and 74. A pair of releasable fasteners 78 can be disposed on each pair of ends (or each cord). In addition, the pair of ends (of each cord) can be tied in a distal knot 88. The releasable fasteners 78 can move or slide independently along the length of the respective loop 70 or 74 to change the size and location of the respective loop 70 or 74. The proximal loop 84 is separated from the loops 70 and 74 by the intermediate knot 80. The front end 54 of the cord 50 can be doubled over onto itself and secured, such as with a crimp, to form a cord loop 92. The cord loop 92 of the cord 50 can be coupled to the proximal loop 84 of the loops 70 and 74 by a releasably fastener, such as a carabiner 96.

Figure 8:
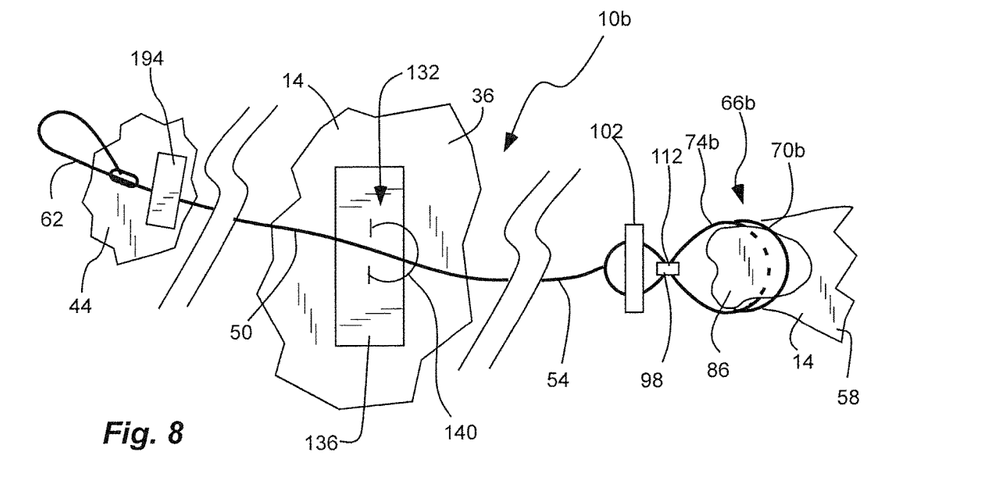
FIG. 8 is a partial detailed top schematic view of the cover with another retraction system in accordance with an embodiment of the invention.
Figure 9:
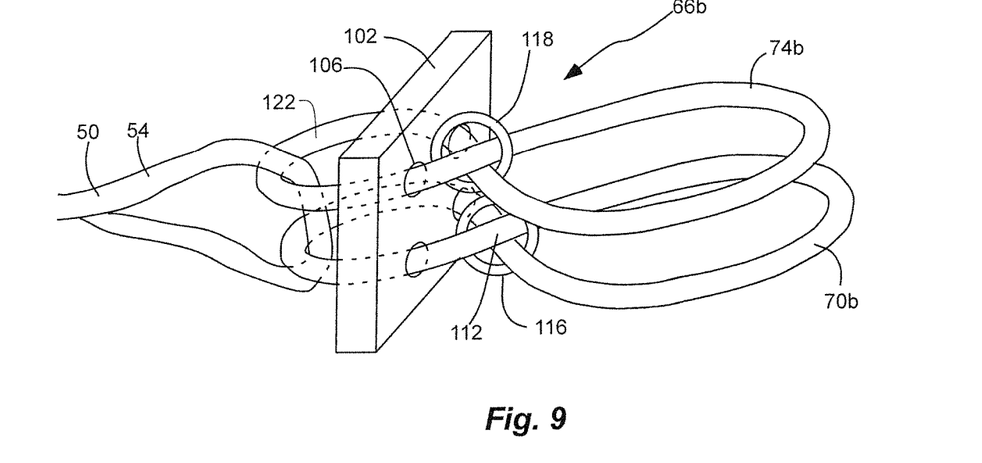
FIG. 9 is a perspective schematic view of a cover attachment of the retraction system of the FIG. 8.

FIG. 8 is a partial detailed top schematic view of the cover 14 and another retraction system 10b. FIG. 9 is a perspective schematic view of another cover attachment 66b of the retraction system 10b of the cover 14. In one aspect, the retraction system 10b can have a cover attachment 66b to couple the cover 14 to the cord 50. The cover attachment 66b is coupled to the front end 54 of the cord 50, and positioned between the front end 54 of the cord 50 and the cover 14, or bottom end 58 thereof. In one aspect, the cover attachment 66b comprises at least one loop 70b or 74b coupled to the front end 54 of the cord 50, and a plate 102 coupled to and intersecting the at least one loop 70b or 74b. The loop 70b or 74b can be flexible, and can be formed from the same material as the cord. The plate 78 can have one or more apertures 106 receiving the loop 70b or 74b therethrough with the loop 70b or 74b extending through the aperture(s) 106 in the plate 102. The portion 86 of the cover 14 can be inserted through the at least one loop 70b or 74b. The portion 86 of the cover 14 in the loop 70b or 74b can be cinched between the loop 70b or 74b and the plate 102. The portion 86 of the cover 14 can include bunching the cover 14, such as the bottom edge 58 of the front panel 42, into multiple folds that consolidates or condenses the cover into a greater thickness or width. Thus, the portion 86 of the cover 14 can be a bunched portion. It is believed that bunching the cover and cinching the cover or bunched portion thereof in the flexible loop reduces stress on the cover and resists ripping or otherwise damaging the cover.

Figure 10A:
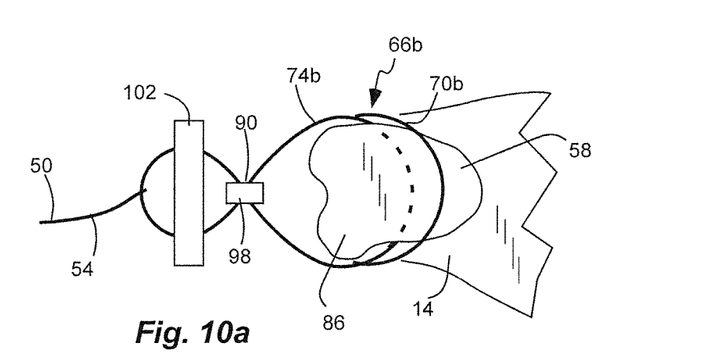
FIG. 10a is a top schematic view of the cover attachment of the retraction system of FIG. 9, shown in an open configuration with the cover.
Figure 10B:
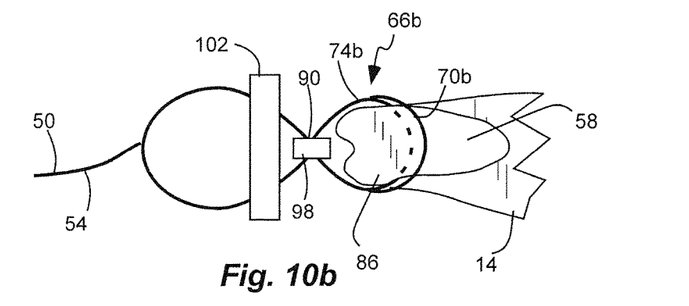
FIG. 10b is a top schematic view of the cover attachment of the retraction system of FIG. 9, shown in a cinch or contracted configuration with the cover.

In another aspect, the cover attachment 66b comprises a pair of loops, including first and second loops 70b and 74b, coupled to the front end 54 of the cord 50, and the plate 102 coupled to and intersecting the loops 70b and 74b. FIG. 10a shows a top schematic view of the cover attachment 66b of the retraction system 10b of the cover 14, showing an open configuration with the cover. A portion 86 of the cover 14 can be inserted through the first and second loops 70b and 74b, around the second loop 74b, and back through the first loop 70b, as shown in FIG. 10a. FIG. 10b shows a top schematic view of the cover attachment 66b of the retraction system 10b of the cover 14, showing a cinch configuration with the cover. The portion 86 of the cover 14 in the pair of loops 70b and 74b can be cinched between the pair of loops 70b and 74b and the plate 102.

Referring again to FIG. 9, the plate 102 can have apertures 106 therein with the pair of loops 70b and 74b extending through the apertures. In one example, the plate 102 can have four apertures 106, as shown. In one aspect, the pair of loops 70b and 74b can be configured as figure-eights. Thus, each loop 70b and 74b can have a portion or half twisted over 180 degrees with respect to the other portion or half forming an intersection 112 of the figure-eight or the twist of the loop. The cover attachment 66b can also have a pair of rings 116 and 118 with each one of the pair of rings disposed at a different intersection 112 of the figure-eights of the pair of loops 70b and 74b. The rings 116 and 118 can maintain the configuration of the loops 70b and 74b as figure-eights. The figure-eight configuration of the loops 70b and 74b can form a forward loop portion and a rearward loop portion 122 separated by the intersection 112 and the rings 116 and 118. The rearward loop portions can extend through the apertures 106 in the plate 102 so that the plate 102 intersects the rearward loop portions of the loops 70b and 74b, and the rings 116 and 118 are disposed forward of the plate 102 opposite of the cord 50. The cord 50 or front end 54 thereof can be attached to the rearward loop portions 122 of the loops 70b and 74b such that pulling the cord 50 draws the loops 70b and 74b through the apertures 106 in the plate 102, and cinches the loops 70b and 74b around the cover 14 or bunch portion 86 thereof, and maintains the force or grip on the cover. The pair of rings 116 and 118 can be oriented substantially perpendicular to the plate 102, and can extend inside the loops 70b and 74b, to maintain the figure-eights.

Referring again to FIGS. 4, 5 and 8, the retraction system 10 or 10b can further include an intermediate guide 132 attached to the cover 14 at an intermediate point of the cover 14 intermediate a length of the top panel 36 of the cover 14. The intermediate guide 132 can also be located over the accessory 34 of the RV 18, as shown in FIGS. 1a, 1b and 2a. The intermediate guide 132 can guide the cord 50, and/or maintain the position of the cord 50 on the cover 14. The cord 50 can pass through the intermediate guide 132, and can be drawn or displaced through the intermediate guide. In one aspect, the intermediate guide 132 can comprise a patch 136 attached to the cover 14. The patch 136 can be attached to the cover 14 with a fastener, such as an adhesive or adhesive layer, double sided tape, stitching, hook-and-loop type fastener which itself can be attached to the cover and the patch by an adhesive or adhesive layer, etc. In addition, the intermediate guide 132 can comprise a ring 140 coupled to the patch 136, and receiving the cord 50 therethrough. In one aspect, the ring 140 may extend through the patch 136 or slots in the patch.

The cover 14 or top panel 36 thereof can rest on the roof 22 of the RV 18, and on the one or more accessories 34. The intermediate guide 132 can be located over one of the accessories 34, such as an AC unit. The accessories 34 can present a challenge to removing and/or deploying the cover 14. The retraction system 10 or 10b facilitates removal of the cover 14 from the RV 18. In one aspect, the retraction system 10 or 10b can be utilized by a single user to remove the cover 14 from the RV 18. In another aspect, an additional user can also help remove the cover. In addition, the retraction system 10 or 10b can allow the cover 14 to be removed from the RV 18 without the use of a ladder.

Figure 2B:
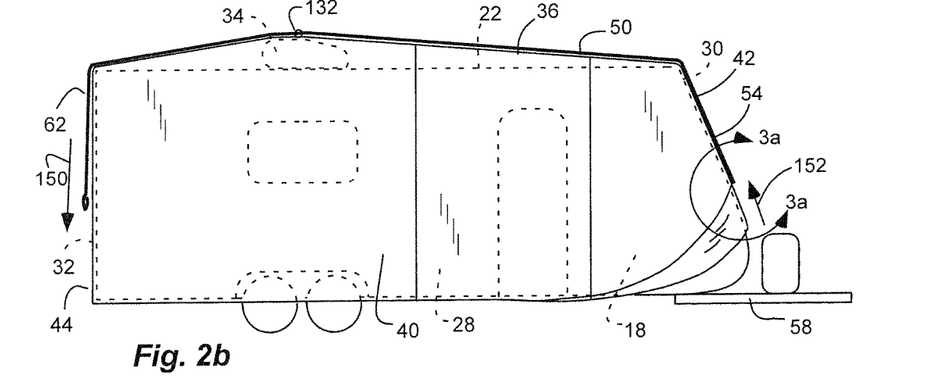
FIGS. 2b-f are side schematic views of the cover with the retraction system on the RV of FIG. 1a, showing a method of removing the cover from the RV using the retraction system.
Figure 2C:
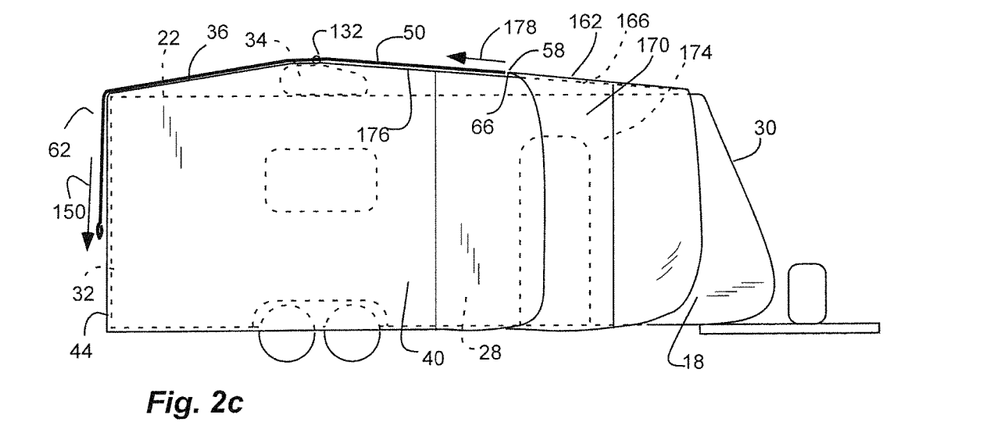
Figures 2D, 3B:
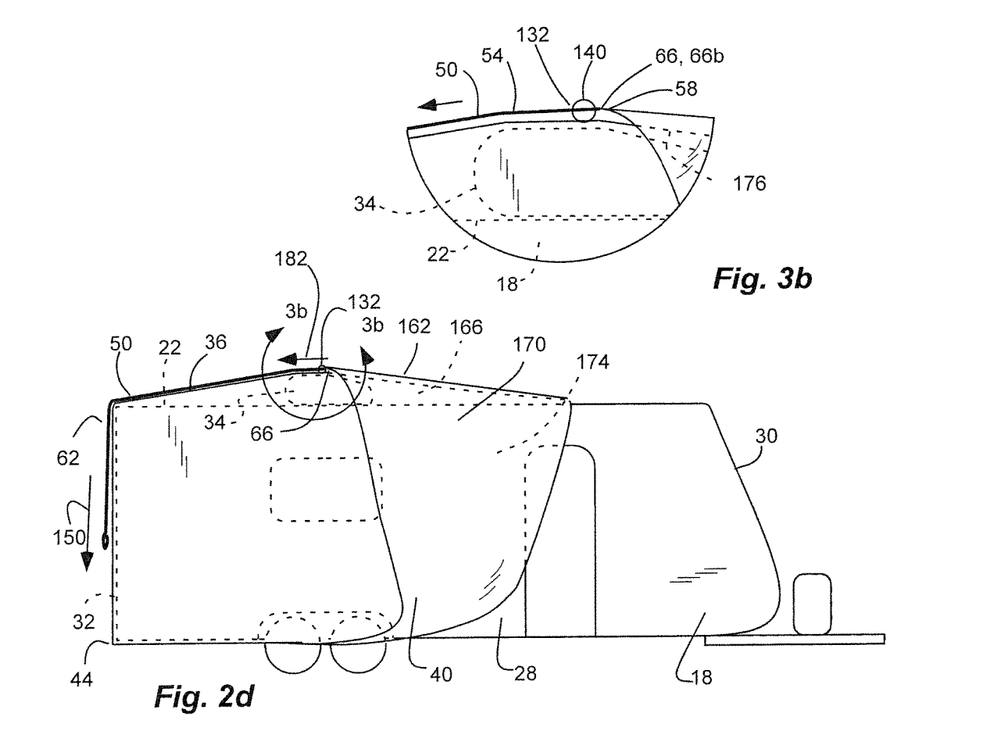
FIGS. 3a and 3b are partial detailed side views of the cover with the retraction system of FIGS. 2b and 2d, respectively.
Figure 2E:
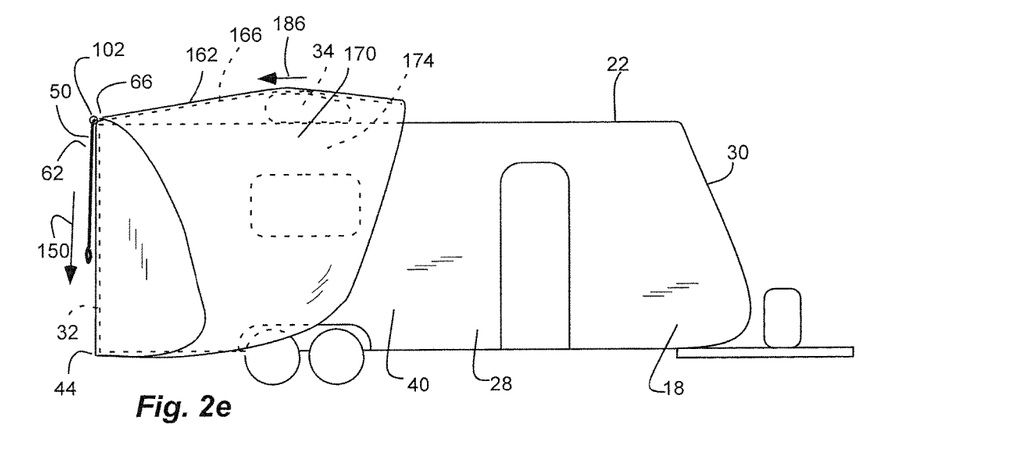
Figure 2F:
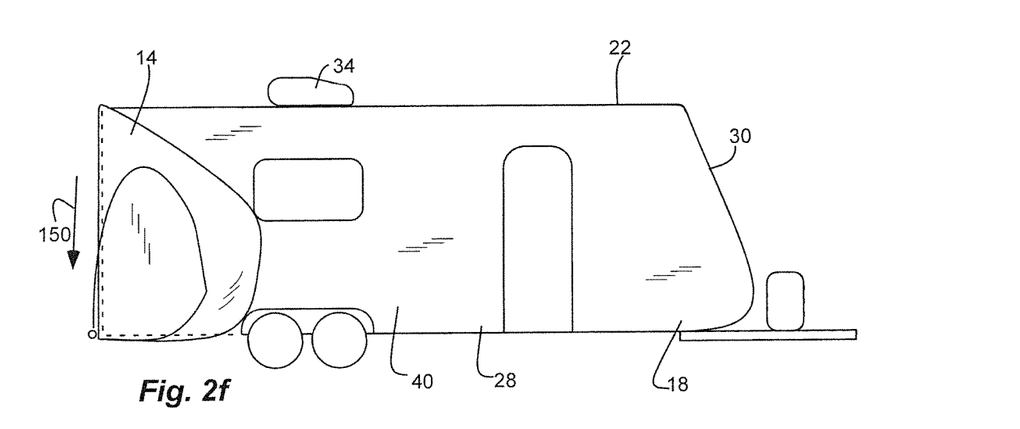
Figure 3A:
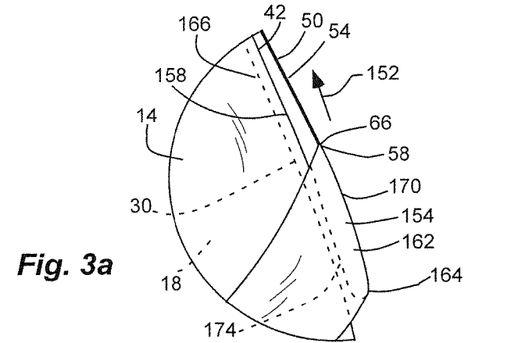

Referring to FIGS. 2b and 3a, to remove the cover 14 from the RV 18 using the retraction system 10 or 10b, a user can pull, indicated by 150 (FIG. 2b), the rear free end 62 of the cord 50, causing the front end 54 of the cord 50 to draw 152 a lower portion 154, or bottom end 58, of the front panel 42 of the cover 14 up and over an upper portion 158 of the front panel 42. Referring to FIGS. 2b, 2c and 3a, pulling 150 and continued pulling of the cord 50 causes a front portion 162 of the cover 14 to fold over 164 an intermediate portion 166 of the cover 14, forming an outer portion 170 of the cover 14 folding over an inner portion 174 of the cover 14. The inner portion 174 of the cover 14 forms a guide 176 for the outer portion 170 of the cover 14 to slide on the guide 176 over the accessory 34 of the RV 18. Referring to FIGS. 2d and 3b, pulling 150 and continued pulling of the cord 50 causes the outer portion 170 of the cover 14 to follow 178 (FIG. 2c) the inner portion 174 of the cover 14 until the front end 54 of the cord 50, and the bottom end 58 of the cover and/or the cover attachment 66 or 66b, reaches the intermediate guide 132, or the ring 140 thereof. Referring to FIG. 2e, pulling 150 and continued pulling of the cord 50 causes the front end 54 of the cord 50 to pull 182 (FIG. 2d) against the intermediate guide 132, and the ring 140 thereof, such that front panel 42, and the intermediate point and intermediate portion 166 of the cover 14 slide 186 over the RV 18. Finally, as shown in FIG. 2f, the cover 14 can be pulled 150 off of the RV 18.

In another aspect, a retraction system 10c can be provided with the cover 14, and can be preinstalled with the cover, as described above. For example, the intermediate guide 132 and the patch 136 thereof can be sewn into the cover 14. Similarly, the front end 54 of the cord 50 can be permanently attached to the front panel 42 (or bottom edge 58) of the cover 14, such as by sewing, indicated by 190 in FIG. 11.

In another aspect, the retraction system 10 or 10b or 10c and cover 14 can have a retainer 194, such as a strap and/or hook-and-loop type fastener, to releasably attach the free rear end 62 of the cord 50 to the rear panel 44 of the cover, as shown in FIGS. 1b and 5.

In another aspect, the retraction system 10 or 10b can be provided as a retrofit system that can be added to an existing cover. Thus, the retraction system 10 and 10b, and components thereof, can be coupleable to the cover 14. The front end 54 of the cord 50 can be releasably and removably coupled to the front panel 42 (or bottom edge 58) by the cover attachment 66 or 66b, as described above. The intermediate guide 132 and the patch 136 thereof can be attached to the intermediate point of the cover 14 by an adhesive, as described above.

Referring to FIGS. 2a-2f, 3a and 3b, a method for using the retraction system 10 or 10b or 10c described above, and for removing the cover 14 or 14c from the recreational vehicle (RV) 18, is shown. As described above, the cover 14 or 14c has at least the top panel 36, the opposite side panels 38 and 40, the front panel 42 and the back panel 44 substantially matching the roof 34, the opposite sides 26 and 28, the front 30 and the back 32 of the RV 18, respectively. The method can comprise providing the cover 14 or 14c with a retraction system 10 or 10b or 10c. The retraction system 10 or 10b or 10c can be provided preinstalled on the cover 14 or 14c, or as a retrofit system 10 or 10b to be added to an existing cover 14, as described above. The retraction system 10 or 10b or 10c comprises the cord 50 extending across the cover 14 or 14c between the front and back panels 42 and 44, with the front end 54 couplable to the front panel 42, or bottom edge 58 thereof, and the rear end 62 disposed at the back panel 44 of the cover 14 or 14c. For simplicity, the method will be described with respect to retraction system 10 and cover 14, with the understanding that such description is applicable to retraction systems 10b and 10c and cover 14c.

In addition, the method comprises pulling 150 the rear end 62 of the cord 54, such as in a downward and/or rearward direction, and causing the front end 54 of the cord 50 to draw 152 the lower portion 154 of the front panel 42 of the cover 14 up and over the upper portion 158 of the front panel 42, and causing the front portion 162 of the cover 14 to fold over 164 the intermediate portion 166 of the cover 14 forming the outer portion 170 of the cover 14 folding over 164 the inner portion 174 of the cover 14.

Furthermore, the method comprises continuing to pull 150 the cord 50 with the front panel 42 of the cover 14 sliding 178 over the cover 14 and following the cover 14 over the accessory 34 of the RV 18, with the outer portion 170 of the cover 14 folded over 164 the inner portion 174 of the cover 14, and with the inner portion 174 of the cover 14 forming the guide 176 for the outer portion 170 of the cover 14 over the accessory 34 of the RV 18.

In one aspect, providing the retraction system 10 includes providing the intermediate guide 132 at the intermediate point of the cover 14 and located over the accessory 34 of the RV 18. As described above, the intermediate guide 132 comprises a patch 136 that can be preinstalled on the cover 14, such as by stitching or sewing, or as a retrofit to be added to an existing cover, such as with an adhesive or hook-and-loop type fastener. The method can further comprise pulling 150 or continuing to pull the cord 50 and causing the outer portion 170 of the cover 14 to follow 178 the inner portion 174 of the cover 14 until the front end 54 of the cord 50 reaches the intermediate guide 132. The method can comprise pulling 170 or continuing to pull the cord 50 with the front end 54 of the cord 50, and/or the cover attachment 66 or 66b, against the intermediate guide 132, and the front panel 42 and the intermediate point of the cover 14 sliding over the RV 18.

In one aspect, providing the retraction system 10 of the cover 14 includes providing the cover attachment 66 or 66b. As described above, the cover attachment 66 or 66b can comprise at least one loop 70 or 74, or 70b or 7b, coupled to the front end 54 of the cord 50. In one aspect, the releasable fastener 78 can be coupled to the loop. In another aspect, the plate 102 can be coupled to and intersecting the at least one loop. The cover 14 or bottom edge 58 thereof can be coupled to the cord 50 by, and the method can further comprise, inserting a portion 86 or bunch of the cover 14 or the bottom edge 58 through the at least one loop 70 or 74, or 70b or t4b, and cinching the portion 86 or bunch of the cover 14 in the loop 70 or 74, or 70b or 74b.

In another aspect, providing the retraction system 10 or 10b of the cover 14 includes providing the cover attachment 66 or 66b with a pair of loops, including first and second loops 70 and 74, or 70b and 74b, coupled to the front end 54 of the cord 50. The cover 14 or bottom edge 58 thereof can be coupled to the cord 50 by, and the method can further comprise, inserting a portion 86 or bunch of the cover 14 through the first and second loops 70 and 74, or 70b and 74b, around the second loop 74 or 74b, and back through the first loop 70 or 70b, and cinching the portion 86 of the cover 14 in the pair of loops 70 and 74, or 70b and 74b, such as by displacing the releasable fastener 78, or by displacing the pair of loops 70b and 74b and the plate 102 together with the portion 86 of the cover 14 therebetween.

In one aspect, the retraction system 10b of the cover 14 can be provided with apertures 106 in the plate 102, and the pair of loops 70b and 74b can extend through the apertures in the plate. Cinching the portion 86 of the cover 14 can include pulling the pair of loops 70b and 74b through the apertures 106 in the plate 102.

In another aspect, the retraction system 10b of the cover 14 can be provided with the pair of loops 70b and 74b configured in figure-eights, and with the pair of rings 116 and 118 each disposed at a different intersection 112 of the figure eights of the pair of loops 70b and 74b.

Figure 11:
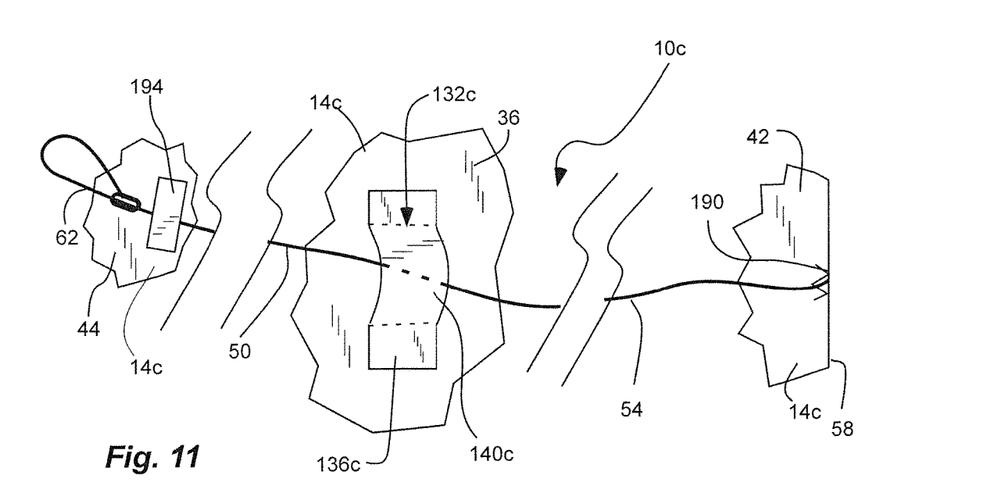
FIG. 11 is a partial detailed top schematic view of another cover with another retraction system in accordance with another example.
Figure 12A:
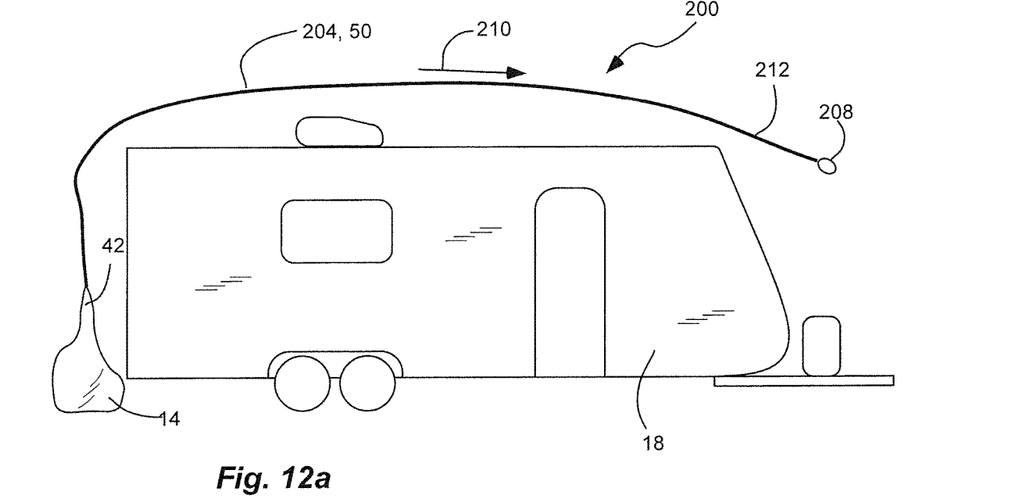
FIGS. 12a-d are side schematic views of another cover, or the cover of FIG. 1a, with a deployment system, on the RV, showing a method for deploying the cover on the RV using the deployment system.
Figure 12B:
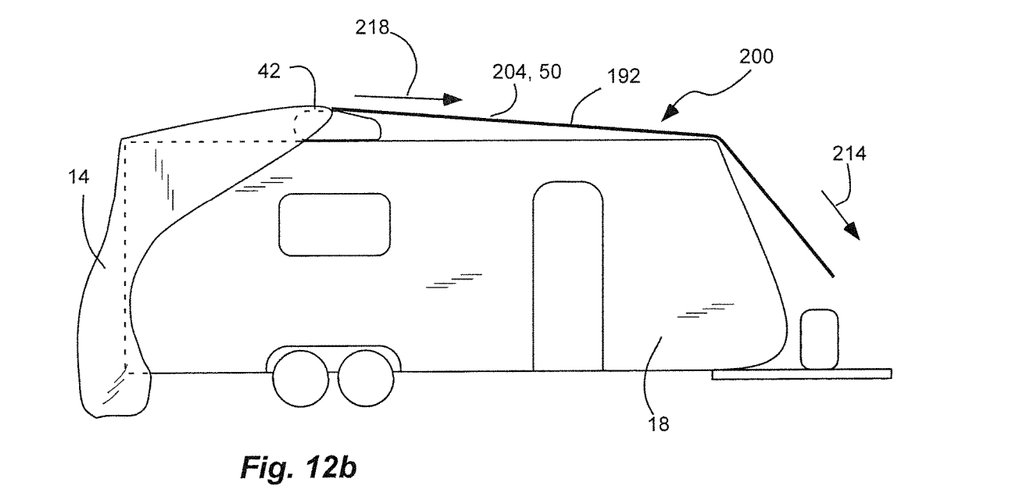
Figure 12C:
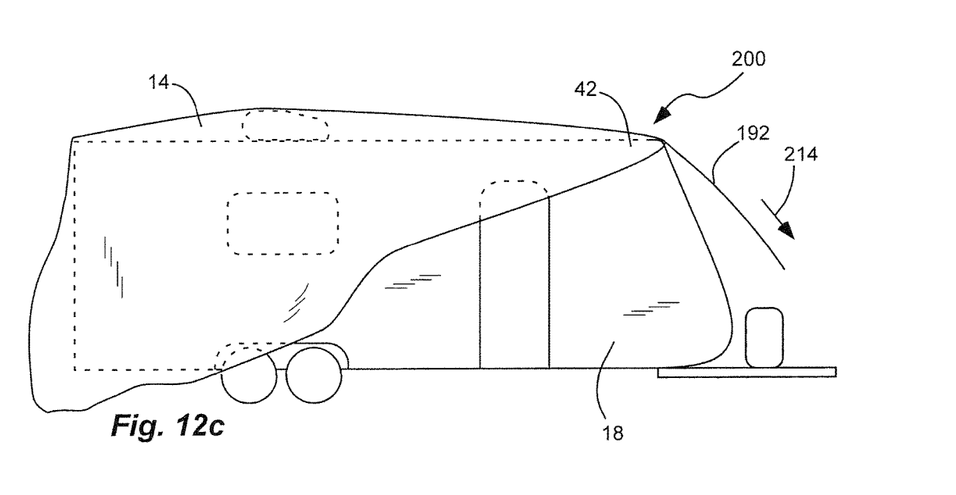
Figure 12D:
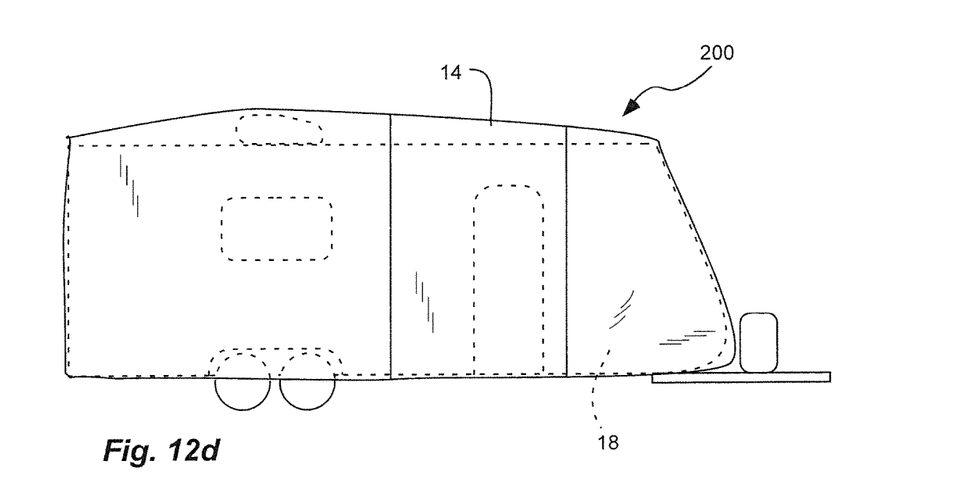

FIG. 11 shows a partial detailed top view of another cover 14c with another retraction system 10c in accordance with another example. The retraction system 10c and the cover 14c can be similar to that described above, and which features can be interchangeable. The intermediate guide 132c can comprise a band 136c with ends attached to the cover 14c, and forming a ring 140c between the band 136c and the cover 14c to receive the cord 50 therethrough. In addition, the front end 54 of the cord 50 can be attached to the front panel 42 or the bottom edge 58 thereof, such as by stitching 190.

FIGS. 12a-12d show side schematic views of a deployment system 200 for the cover 14, or another cover, to deploy the cover on the RV 18. In one example, the deployment system 200 comprises a different, secondary cord 204. In another example, the deployment system can utilize the cord 50 of the retraction system 10 described above. The cord 204 or 50 is coupled to the front panel 42 of the cover 14, and has a weight 208 on a free end 192 of the cord. The weight can 208 can comprise a pliable material in a flexible container, such as sand in a bag, to avoid injury or damage. The weight 208 can have a weight greater than a weight of the free end 192 of the cord. The weight 208 can cause the cord 204 or 50 to extend over the RV 18 when the weight 208 is thrown 210 from the rear of the RV 18, over the top of the RV to the front of the RV. The free end 212 of the cord 204 or 50 can be pulled 214 to cause the cover 14 to be drawn 218 up the rear of the RV, and over the top of the RV to front of the RV.

In addition, FIGS. 12a-12d show a method for deploying the cover 14 on the RV 18 using the deployment system 200. The method comprises providing the cover 14 with a deployment system 200. In one aspect, the deployment system 200 can comprise a different, secondary cord 204. In another aspect, the deployment system 200 can comprise the same cord 50 as the retraction system 10. The cord 50 or 204 can be coupled to the front panel 42 of the cover 14, and can have a weight 208 on a free end 212 of the cord. The method also comprises throwing the weight 208 from a rear of the RV 18, over a top of the RV to a front of the RV. The method further comprises pulling the free end 212 of the cord 204 or 50 forwardly and drawing the cover 14 up the rear of the RV 18, and over the top of the RV to front of the RV.

While the forgoing examples are illustrative of the specific embodiments in one or more particular applications, it will be apparent to those of ordinary skill in the art that numerous modifications in form, usage and details of implementation can be made without departing from the principles and concepts articulated herein.

What is claimed is:

1. A cover with a retraction system configured for covering a recreational vehicle (RV), comprising:
   a top panel, opposite side panels contiguous with the top panel, a front panel contiguous with the top panel, and a back panel contiguous with the top panel, and configured to substantially match a roof, opposite sides, a front and a back of the RV, respectively; and
   a cord extending across the cover between the front and back panels with a front end couplable to the front panel, and a rear free end disposed at the rear panel of the cover.

2. The cover of claim 1, wherein the front end of the cord is attached to a bottom edge of the front panel of the cover; and wherein the cord extends substantially a length of the cover from the bottom edge of the front panel of the cover, across the front panel and the top panel of the cover, to the back panel of the cover.

3. The cover of claim 1, wherein pulling the rear free end of the cord causes the front end of the cord to draw a lower portion of the front panel of the cover up and over an upper portion of the front panel, and causes a front portion of the cover to fold over an intermediate portion of the cover forming an outer portion of the cover folded over an inner portion of the cover.

4. The cover of claim 1, wherein pulling the rear free end of the cord causes the front panel of the cover to slide over the cover and follow the cover over an accessory of the RV extending above a roof of the RV, with an outer portion of the cover folded over an inner portion of the cover, and with the inner portion of the cover forming a guide for the outer portion of the cover over the accessory of the RV.

5. The cover of claim 1, further comprising:
   an intermediate guide at an intermediate point of the cover and configured to be located over an accessory of the RV; and
   the cord passing through the intermediate guide.

6. The cover of claim 5, wherein the intermediate guide comprises:
   a patch coupled to the cover; and
   a ring coupled to the patch and receiving the cord therethrough.

7. The cover of claim 6, wherein pulling the cord causes an outer portion of the cover to follow an inner portion of the cover until the front end of the cord reaches the intermediate guide; and wherein further pulling the cord causes the front end of the cord to abut against the intermediate guide, and the front panel and the intermediate point of the cover to slide over the RV.

8. The cover of claim 1, further comprising:
   a cover attachment between the front end of the cord and the cover, the cover attachment comprising at least one contractible loop coupled to the front end of the cord;
   a portion of the cover inserted through the at least one loop; and
   the portion of the cover in the loop constrained within the at least one loop when the at least one loop is contracted.

9. The cover of claim 1, further comprising:
   a cover attachment between the front end of the cord and the cover, the cover attachment comprising a pair of loops, including first and second loops, coupled to the front end of the cord;
   a portion of the cover inserted through the first and second loops, around the second loop, and back through the first loop; and
   the portion of the cover in the pair of loops being constrained therein.

10. The cover of claim 1, further comprising a deployment system comprising:
    a secondary cord coupled to the front panel of the cover and having a weight on a free end of the secondary cord.

11. The cover of claim 10, wherein the weight causes the secondary cord to extend over the RV when the weight is thrown from the back of the RV, over the top of the RV to the front of the RV; and wherein pulling the free end of the secondary cord causes the cover to be drawn up the back of the RV, and over the top of the RV to front of the RV.

12. A retraction system configured for a cover for a recreational vehicle (RV), the system comprising:
    a cord with a front end and a rear end;
    a cover attachment disposed on the front end of the cord and configured to be attached to the cover;
    an intermediate guide configured to be attached at an intermediate point of the cover and configured to be located over an accessory of the RV; and
    the cord passing through the intermediate guide.

13. The retraction system of claim 12, wherein the intermediate guide comprises:
    a patch coupled to the cover; and
    a ring coupled to the patch and receiving the cord therethrough.

14. The retraction system of claim 12, wherein the cover attachment further comprises:
    at least one contractible loop coupled to the front end of the cord.

15. The retraction system of claim 12, wherein the cover attachment further comprises:
    a pair of loops, including first and second loops, coupled to the front end of the cord.

16. A retraction system configured for a cover for a recreational vehicle (RV), the system comprising:
    a cord with a front end and a rear end;
    a cover attachment disposed on the front end of the cord and configured to be attached to the cover; and
    the cover attachment comprising a contractible loop.

17. The retraction system of claim 16, wherein the cover attachment further comprises:
    a releasable fastener coupled to the contractible loop and receiving the loop therethrough; and
    the releasable fastener being selectively positionable along the loop to contract the loop and change a size of the loop.

18. The retraction system of claim 16, wherein the cover attachment further comprises:
    an intermediate guide configured to be attached at an intermediate point of the cover and configured to be located over an accessory of the RV; and
    the cord passing through the intermediate guide.

19. A method for removing a cover from a recreational vehicle (RV), the cover having at least a top panel, opposite side panels, a front panel and a back panel substantially matching a roof, opposite sides, a front and a back of the RV, respectively, the method comprising:
    providing a retraction system comprising a cord extending over the RV and across the cover between the front and back panels with a front end couplable to the front panel, and a rear end disposed at the back panel of the cover;
    pulling the rear end of the cord and causing the front end of the cord to draw a lower portion of the front panel of the cover up and over an upper portion of the front panel, and causing a front portion of the cover to fold over an intermediate portion of the cover forming an outer portion of the cover folding over an inner portion of the cover; and continuing to pull the cord with the front panel of the cover sliding over the cover and following the cover over an accessory of the RV extending above the roof of the RV, with the outer portion of the cover folded over the inner portion of the cover, and with the inner portion of the cover forming a guide for the outer portion of the cover over the accessory of the RV.

20. The method of claim 19, further comprising:

providing the retraction system with an intermediate guide at an intermediate point of the cover located over the accessory of the RV;

pulling the cord and causing the outer portion of the cover to follow the inner portion of the cover until the front end of the cord reaches the intermediate guide; and continuing to pull the cord with the front end of the cord against the intermediate guide and the front panel and the intermediate point of the cover sliding over the RV.

21. The method of claim 19, further comprising:

providing the retraction system of the cover with a cover attachment comprising at least one loop coupled to the front end of the cord;

inserting a portion of the cover through the at least one loop; and contracting the loop about the portion of the cover in the loop.

22. The method of claim 19, further comprising:

providing the retraction system of the cover with a cover attachment comprising a pair of loops, including first and second loops, coupled to the front end of the cord;

inserting a portion of the cover through the first and second loops, around the second loop, and back through the first loop; and contracting the pair of loops about the portion of the cover in the pair of loops.

* * * * *